United States Patent
Liu

(10) Patent No.: US 9,575,854 B1
(45) Date of Patent: Feb. 21, 2017

(54) CASCADE FAILURE RESILIENT DATA STORAGE

(71) Applicant: GOOGLE INC., Mountain View, CA (US)

(72) Inventor: Yifang Liu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 89 days.

(21) Appl. No.: 14/272,241

(22) Filed: May 7, 2014

Related U.S. Application Data

(60) Provisional application No. 61/925,169, filed on Jan. 8, 2014.

(51) Int. Cl.
  *G06F 11/00* (2006.01)
  *G06F 11/20* (2006.01)
(52) U.S. Cl.
  CPC .................. *G06F 11/2007* (2013.01)
(58) Field of Classification Search
  CPC ............. G06F 11/2007; G06F 11/3006; G06F 11/0709; G06F 11/203
  See application file for complete search history.

(56) References Cited

U.S. PATENT DOCUMENTS

| | | | |
|---|---|---|---|
| 7,900,206 B1 * | 3/2011 | Joshi | G06F 9/505 709/223 |
| 2006/0112297 A1 * | 5/2006 | Davidson | G06F 11/1438 714/2 |
| 2011/0267962 A1 * | 11/2011 | J S A | H04L 41/147 370/242 |
| 2015/0195192 A1 * | 7/2015 | Vasseur | G06F 11/2007 714/47.3 |

* cited by examiner

*Primary Examiner* — Bryce Bonzo
*Assistant Examiner* — Katherine Lin
(74) *Attorney, Agent, or Firm* — Lerner, David, Littenberg, Krumholz & Mentlik, LLP

(57) ABSTRACT

A system and method for preventing cascading failures of clusters in a large-scale distributed system are disclosed. An example method begins with determining the current system conditions including the state and capacity of each cluster in the system. Given the current system conditions, the maximum number of entities that can be served by the system may be determined. The determined maximum number of entities are then served. In the event of a cluster failure, a determination is made as to whether the entire load from a cluster can be failed over by the system without creating cascading failures. Responsive to determining that the entire load from a cluster cannot be failed over by the system without creating cascading failures, a partial amount of cluster load is identified to failover in the event of cluster failure.

16 Claims, 9 Drawing Sheets

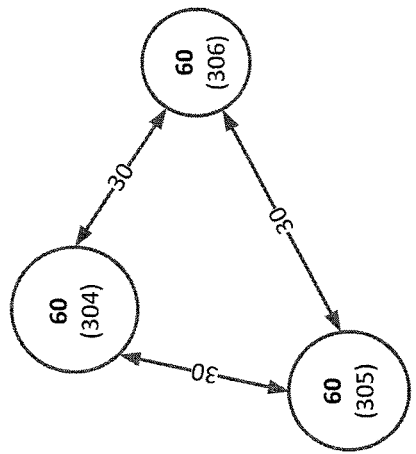
FIG. 3a
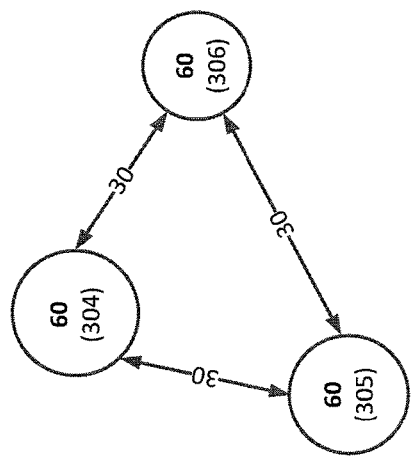
FIG. 3b
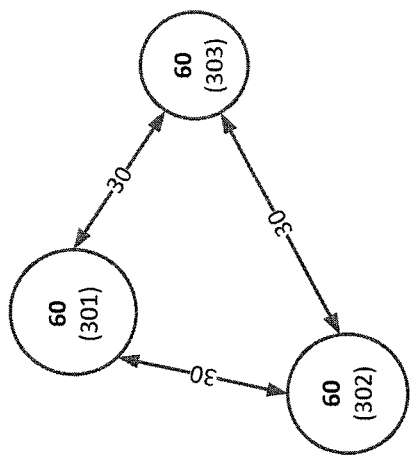
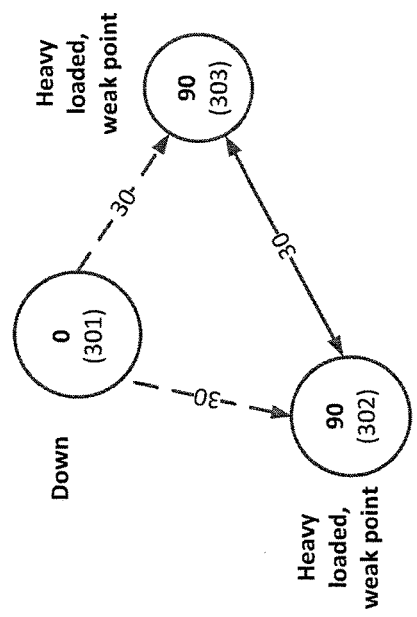

CASCADE FAILURE RESILIENT DATA STORAGE

This non-provisional application claims the benefit of U.S. Provisional Application No. 61/925,169 filed Jan. 8, 2014. The entire contents of the above application are hereby incorporated by reference.

BACKGROUND

In recent years, software engineers have focused on building global-scale Internet applications. These Internet applications often require large-scale distributed systems as back ends. As shown in FIG. 1, large-scale distributed systems provide networked online storage and allow multiple computing devices to store, access, and share data in the online storage. Distributed systems may use a client/server architecture in which one or more central servers store data and provide data access to network clients. Data may be stored in multiple datacenters and in multiple datacenter shards which each contain multiple clusters.

FIG. 2 illustrates a block diagram of an exemplary distributed system 200 for providing data in a large-scale distributed system. The system 300 includes a plurality of user terminals 202 (e.g. 202-1 . . . 202-$n$), each of which includes one or more applications 204 (e.g. 204-1 . . . 204-$n$), such as an Internet browser. The user terminals 202 are connected to a server 206 and a plurality of computer clusters 210 (e.g., 210-1 . . . 210-$m$) through a network 208 such as the Internet, a local area network (LAN), a wide area network (WAN), a wireless network, or a combination of networks. The server 206 may include one or more load balancing engines 212, one or more memory devices 214, and one or more CPUs 216.

Each of the user terminals 202 may be a computer or similar device through which a user can submit requests to and receive results or services from the server 206. Examples of the user terminals 202 include, without limitation, desktop computers, notebook computers, tablets, mobile devices such as mobile phones, smartphones, personal digital assistants, set-top boxes, or any combination of such devices.

In order to support global-scale access to data, distributed systems should have high availability and low latency when providing data to users. Distributed systems may also require service resiliency, which is the ability of a distributed system to quickly react to a series of system failures or disruptions to data access and to smoothly maintain data availability at an acceptable level. In the case of failure or disruption, a system should be able to avoid cascading failure and maintain the availability of a service. A system should also be able to quickly rebalance the service loads across clusters so that the system is prepared for future failures.

Data replication is a widely used conventional technique in distributed computing for better data reliability. Replication entails creating copies (or replicas) of data entities and storing the entity copies in multiple datacenters. By maintaining several copies of the same entity, an application can ensure that its back end can tolerate datacenter failures. If a datacenter is unavailable, replicate entities can be accessed from alternate datacenters.

A conventional coarse-grained replication scheme for better data reliability includes duplicating an entire database in a single replica set, which is usually determined prior to duplication. Coarse-grained replication schemes may handle service resiliency by providing data from replicas in other data clusters when clusters in datacenters fail. However, the conventional coarse-grained replication scheme may not be able to provide fast data access and due to legal requirements, not every data entity can be replicated everywhere.

To address these issues, an alternative replication scheme, referred to as fine-grained replication (FGR) has been used in global-scale applications. In the FGR scheme, an entire database is portioned into a number of sub-databases, each of which has its own replication set. The partition criterion may vary depending on application logic. A common practice is to partition the database by individual service entity. FGR allows flexible replica placement in order to satisfy various performance, load, cost, legal, and other requirements for a single service.

In FGR configurations, there is a serving replica for every data entity stored in the system. A serving replica is the primary replica of a data entity providing service on the data entity in normal operation. A failover replica is the secondary replica of an entity providing failover service in case of primary replica failure. The roles of a data entity's replicas can be changed online with very low operation cost. In a case of cluster failure, entities with their serving replicas in the failed cluster will have the service load shifted to their corresponding failover replicas automatically. Data consistency among replicas of an entity is guaranteed by various distributed system algorithms. Some replicas in the replica set of an entity can temporarily fall behind due to reasons such as a datacenter being unreachable or unresponsive. An FGR-based application can tolerate temporary inconsistency between replicas of an entity Although FGR provides advantages in flexibility, creating a resilient FGR configuration scheme is extremely challenging because this scheme requires: (1) a prohibitively high computing complexity in solving for replication configuration (including replica placement and service scheduling) to achieve service resiliency and (2) expensive and time-consuming executions of replication configuration solutions involving moving and copying data partitions.

SUMMARY

This specification describes technologies relating to techniques for service resiliency in large-scale distributed systems in general, and specifically to methods for achieving resilient fine-grained data replication configurations using lossless dimensionality reduction techniques. These methods address highly complex replication configuration problems using offline placement, online scheduling, and cascade avoidance techniques.

Current techniques for service resiliency in fine-grained replication are far from ideal. For example, an online fast failover mechanism automatically falls back to another replica in a second cluster when the service from one replica becomes unavailable. This process may cause cascading failures if the load failing over to the other replica in the second cluster causes that cluster to overload and fail. The main shortcomings of conventional techniques include: (i) vulnerability to more than one failure or disruption; (ii) incapability of supporting dynamic resilient scheduling; (iii) slow/non-responsiveness on replication configuration solving and execution; and (iv) low-usage of computing resources due to simple preset over-provisioning.

In general, one aspect of the subject matter described in this specification can be embodied in systems and methods for preventing cascading failures of clusters in a large-scale distributed system. An example system includes one or more processing devices and one or more storage devices storing instructions that, when executed by the one or more processing devices, cause the one or processing devices to execute an example method. An example method includes: determining the current system conditions including the state and capacity of each cluster in the system; given the current system conditions, determining the maximum number of entities that can be served by the system; serving the determined maximum number of entities; determining whether, in the event of a cluster failure, an entire load for a cluster can be failed over by the system without creating cascading failures; and responsive to determining that the entire load from a cluster cannot be failed over by the system without creating cascading failures, identifying a partial amount of cluster load to failover in the event of a cluster failure.

These and other embodiments can optionally include one or more of the following features. A dimensionality reduction technique may be used in order to determine the maximum number of entities that can be served by the system and the amount of load that should be failed over. A dimensionality reduction technique may be online scheduling or offline placement. Determining the maximum number of entities that can be served by the system may include identifying the variance of entity loads in the system. The variance of entity loads may be affected by network communication variance including network bandwidth and network delay. The variance of entity loads may be affected by computing resources available in the large-scale distributed system.

The details of one or more embodiments of the invention are set forth in the accompanying drawings which are given by way of illustration only, and the description below. Other features, aspects, and advantages of the invention will become apparent from the description, the drawings, and the claims. Like reference numbers and designations in the various drawings indicate like elements.

BRIEF DESCRIPTION OF THE DRAWINGS

FIG. 3a is an example replication configuration with poor resiliency.

FIG. 3b is an example replication configuration with poor resiliency and one cluster failure.

DETAILED DESCRIPTION

Brief explanations of some of the frequently used notations for the following description are as follows:

| symbol | meaning |
|---|---|
| $D_k$ | the kth computer cluster |
| DC | the set of all computer clusters available to a cloud application |
| E | the set of all entities |
| $y(D_{k1}, \ldots, D_{km})$ | the number of entities with replication set, i.e., a list of clusters $D_{k1}, D_{k2}, \ldots, D_{km}$ |
| $x(D_{k1}^1, \ldots D_{km}^m)$ | the number of entities with replication configuration $[D_{k1}, D_{k2}, \ldots, D_{km}]$ |
| $x(D_k^i)$ | the number of entities with their ith replicas placed in cluster $D_k$ |
| $x(D_k^i, D_l^j)$ | the number of entities with the ith replica placed in cluster $D_k$ and the jth replica placed in cluster $D_l$, $i \in \{1, \ldots, m\}, j \in \{1, \ldots, m\}, i \neq j$. Note $x(D_k^i, D_l^j)$ and $x(D_l^j, D_k^i)$ |
| n | the number of computer clusters in the cloud platform |
| m | the number of replicas in an entity replica configuration |

DEFINITIONS

Entity Replica Set is the list of computer clusters hosting every replica of an entity. The order of clusters does not matter.

Entity Replica Configuration is an ordered list of computer clusters hosting every replica of an entity. For example, [D1, . . . Dm] represents an entity replica configuration in which entity replicas from the first to the mth replica are placed in clusters from D1 to Dm respectively. The same cluster may show up in the list more than once since a cluster may host more than one replica of the entity.

Replication Configuration is the collection of all entity replica configurations in which each unique entity replica configuration is associated with the count of entities with the specific entity replica configuration.

As recognized by the inventor, there should be methods for determining replica configurations in large-scale distributed systems that address the problems with current service resiliency techniques for fine-grained replication configurations.

FIG. 3 a and b illustrates an example replication configuration with poor service resiliency. Each cluster is represented by a circle and each relationship between clusters is represented by a directed line. The system represented in FIGS. 3a and b has 260 entities, each of which has two replicas. Each cluster may have a capacity of serving 100 entities. The directed edges show the serving-failover relationship between a pair of clusters, where the number on the edge denotes the number of entities that have this serving-failover relationship. If a cluster fails as shown in FIG. 3b (301), the load must be shifted to other clusters. As a result, the clusters become heavily loaded (302, 303) and are potentially vulnerable to further failure.

Figure 1:
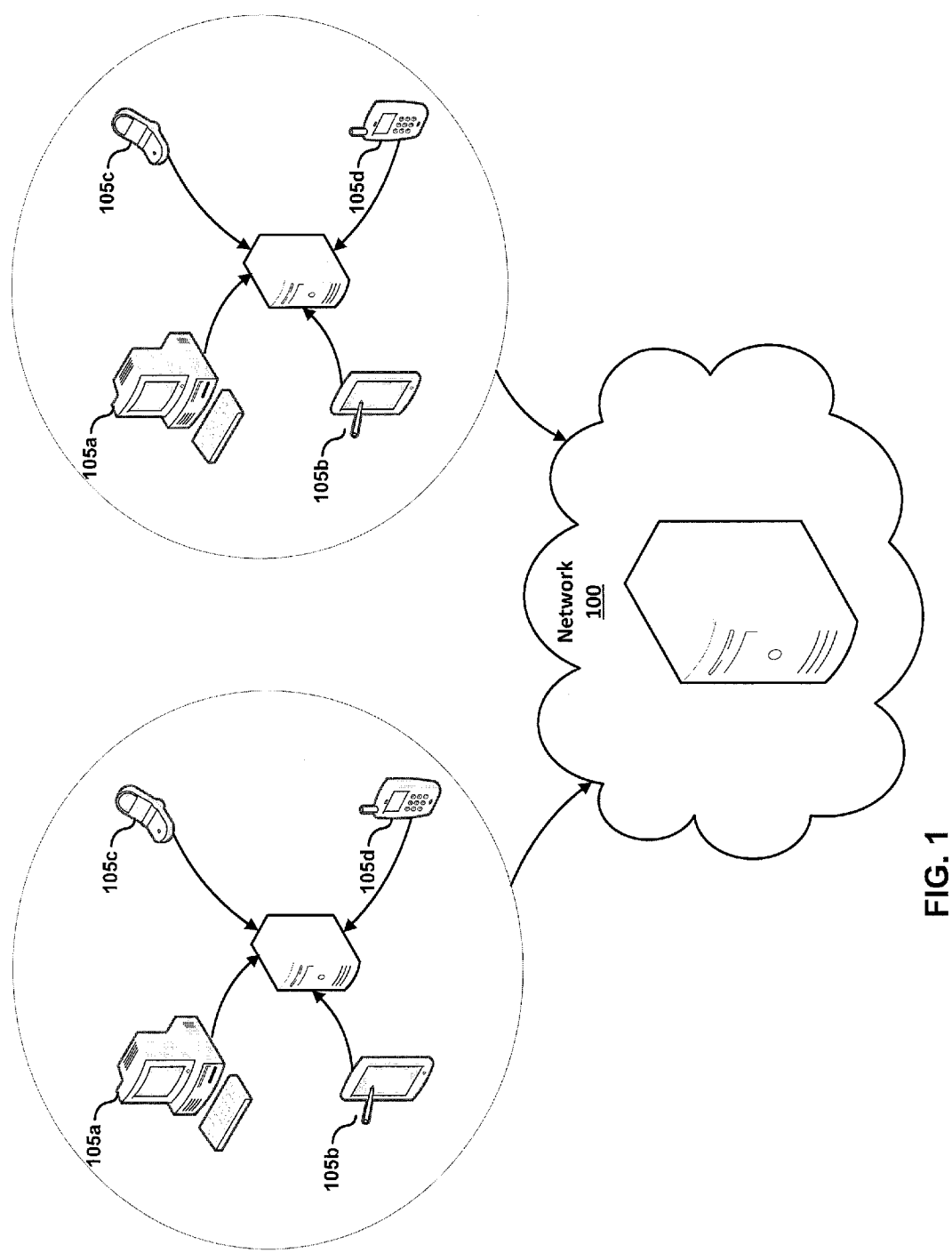
FIG. 1 is a block diagram illustrating an exemplary configuration of a large-scale distributed storage system.
Figure 2:
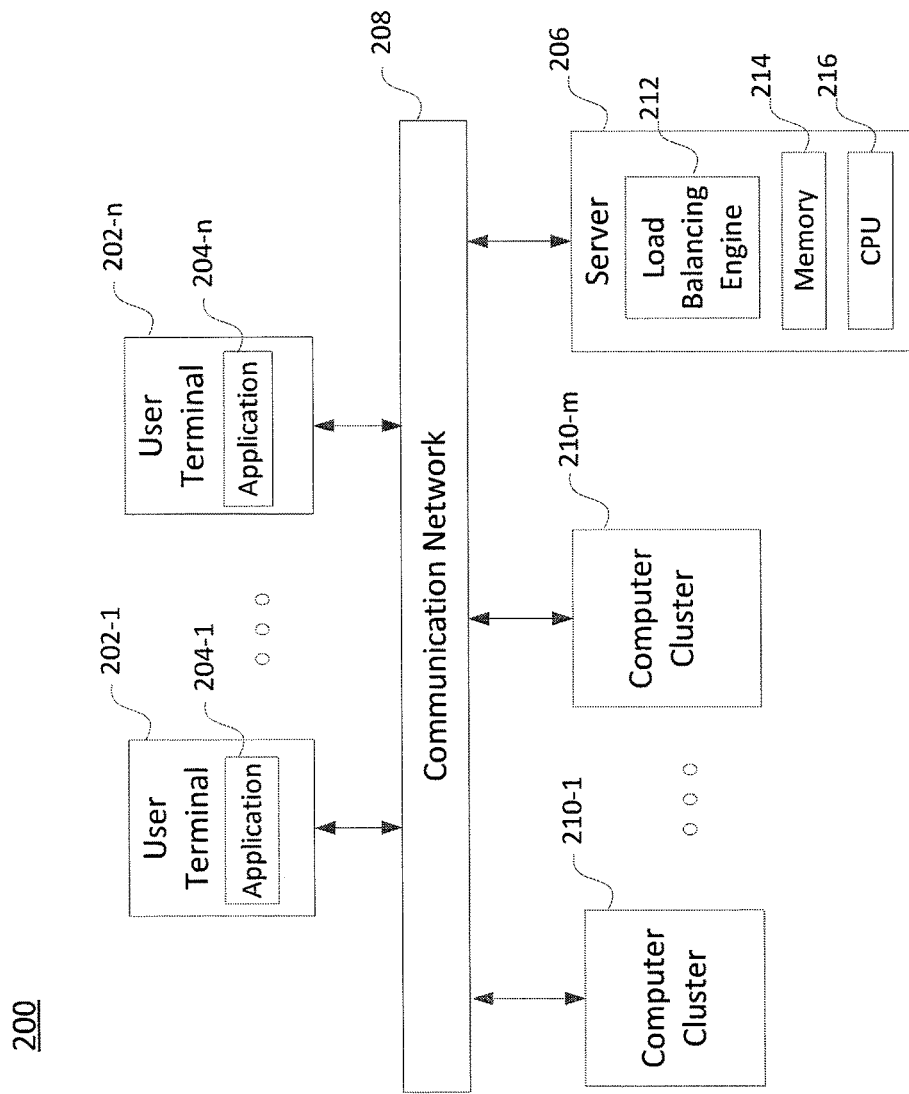
FIG. 2 is a block diagram illustrating an exemplary system for implementing resource allocation in distributed systems.
Figure 4:
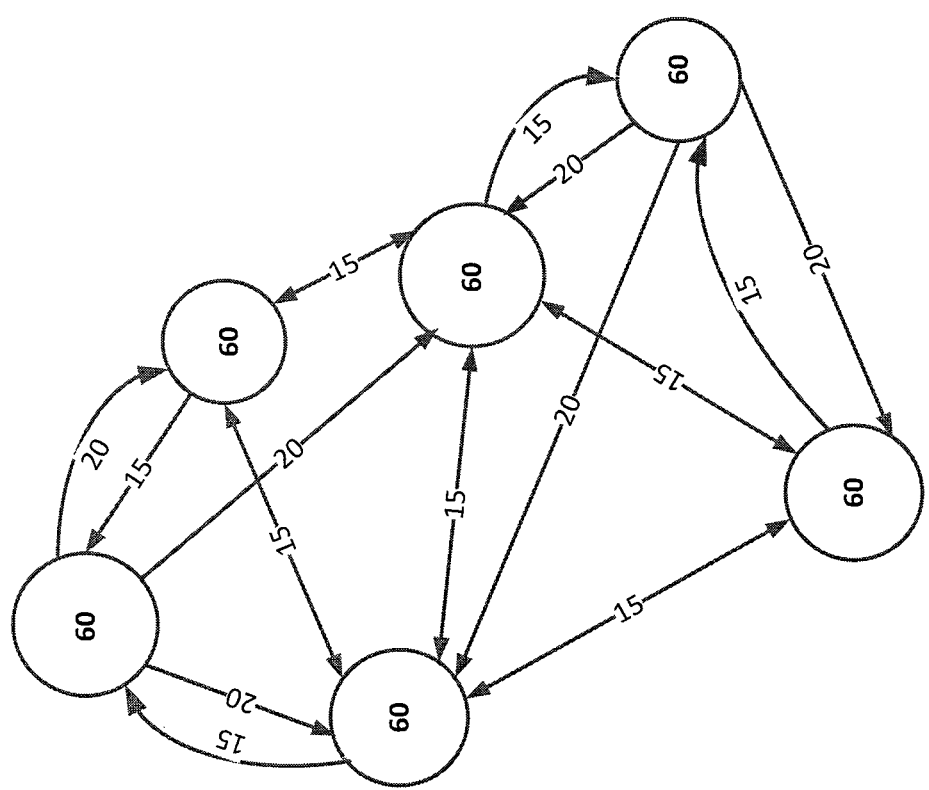
FIG. 4 is an example replication configuration with better resiliency that has the same system setup and load as FIGS. 3a and 3b.

FIG. 4 shows a configuration with better resiliency that has the same number of entities, replicas, and service load as the configuration of FIG. 3. If a cluster fails in this configuration, the load is shifted to other clusters which will obtain higher loads. However, the extra loads can be further spread out to other clusters without moving data. The serving-failover relationship exists between any connected clusters. Thus the configuration has the potential to redistribute the load and restore the system to a balanced state. A goal of an exemplary embodiment is to achieve an initial placement of replicas that achieves service resiliency and can redistribute cluster load upon failures or disruptions in the system.

Figure 8:
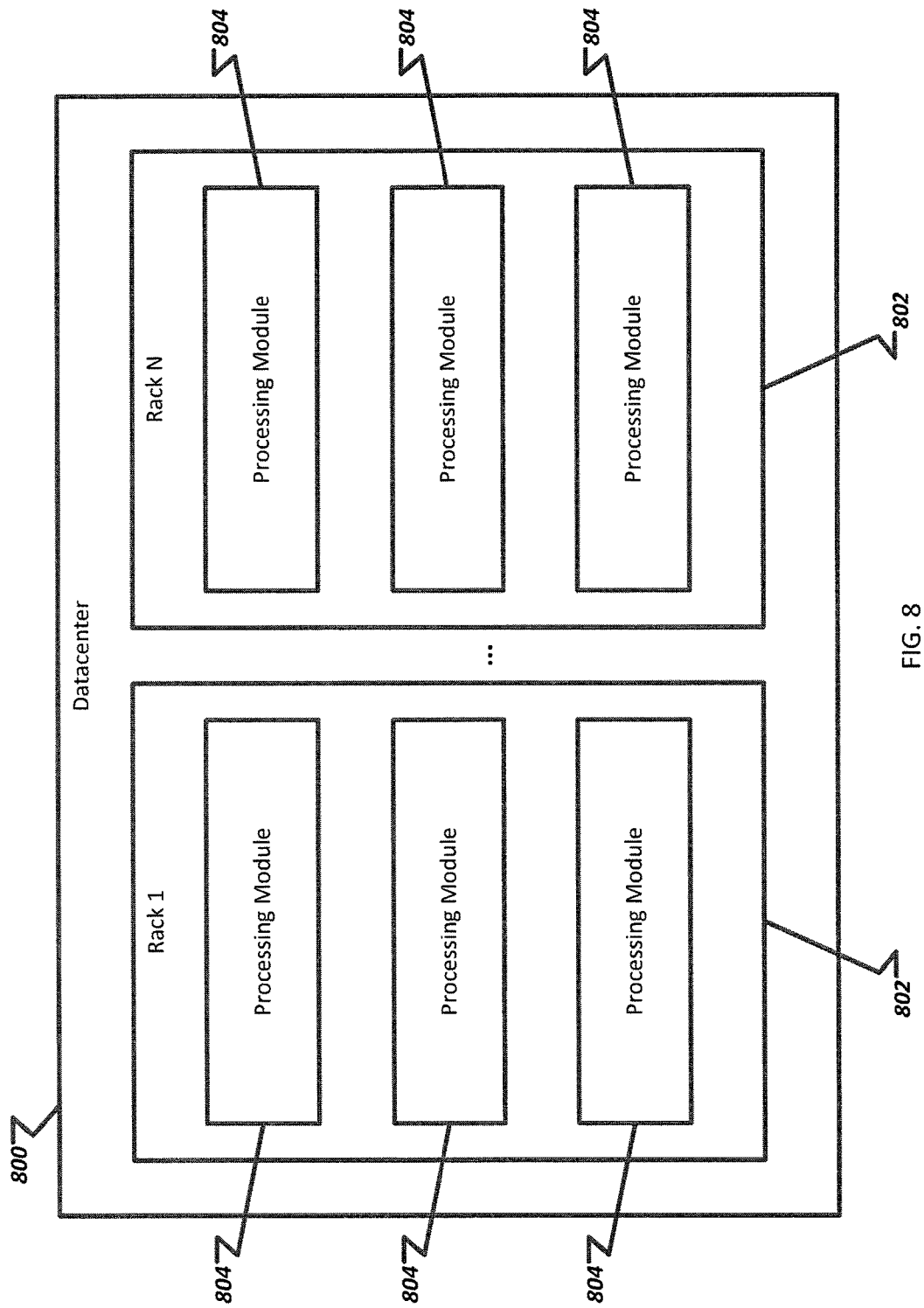
FIG. 8 is an example datacenter.

To determine replication configuration, an exemplary method may consider large-scale system characteristics such as the number and location of datacenters, the datacenters' serving capacities, the number of entities for which the system must store entity replicas, and the number of replicas desired for each entity. An example datacenter is illustrated in FIG. 8.

When determining replication configuration in a large-scale distributed system, a software engineer may want to optimize configurations for one or more objectives in order to obtain service resiliency. For example, a replication configuration may be optimized for avoiding cascading failure by ensuring that failover relationships among data clusters are designed so that, for any cluster, the total capacity that other clusters directly failover to the cluster does not exceed the cluster's capacity.

Replication configurations may additionally or alternatively be optimized for inter-replica service load shift flow. The service shift flow may be maximized among clusters to make it possible to shift load from any cluster in the system to the rest of the system by simply reassigning the serving replicas of some entities within the system. Then, even if there is a cluster failure or disruption in the system, the system can quickly adapt to the sudden load change and recover to a balanced state. Inter-replica co-fail risk minimization is another objective for which a system may be optimized. There is a risk that more than one entity replica of a given entity is placed in clusters that are highly correlated in failure. For example, the same cluster may host more than one entity replica of an entity in an entity replication configuration. Another example of co-failing replica placement is placing two entity replicas in two clusters in the same datacenter or in the same municipal network area. An optimization problem may be to minimize the likelihood that more than one entity replica will fail.

Inter-replica distance optimization may be another optimization objective for replication configurations to achieve service resiliency. All replicas of an entity may be preferred to be placed in clusters of one network or region in geographically closely located datacenters so that the data communication among replicas of the entity do not need to rely on high-latency expensive WAN connections. Another objective may be inter-replica network bandwidth optimization since data communication among replicas of an entity present demand on network bandwidth. High-usage capacity planning may be an additional optimization to provide service resiliency. Using this optimization, there may be flexible serving-failover planning and service lad shift flow. This optimization achieves high usage of resources while offering high resiliency. To optimize in this way, there may be a set of cluster serving capacity variables that are no more than the real available resource in corresponding clusters and are used as the upper limit of resources that can be used by an application. These capacity decision variables and related constraints may be used to determine an initial configuration of the large-scale distributed system According to an exemplary embodiment, an exemplary method may provide techniques to determine a solution for a replication configuration problem that obtains service resiliency using one or more objectives such as the above-mentioned objectives. An exemplary embodiment may use a resilient fine-grained replication configuration method, based on Replica Vector Decomposition (RVD) in order to find an optimum solution for a given replication configuration problem. There may be an offline placement technique using RVD that provides an initial replication configuration for a large-scale system. An online scheduling technique may also use RVD and rebalance a system when there has been a storage failure and subsequent failover in the system. In some exemplary embodiments, there may be an additional technique to prevent cascading failures by using partial failover and online scheduling techniques.

Figure 5:
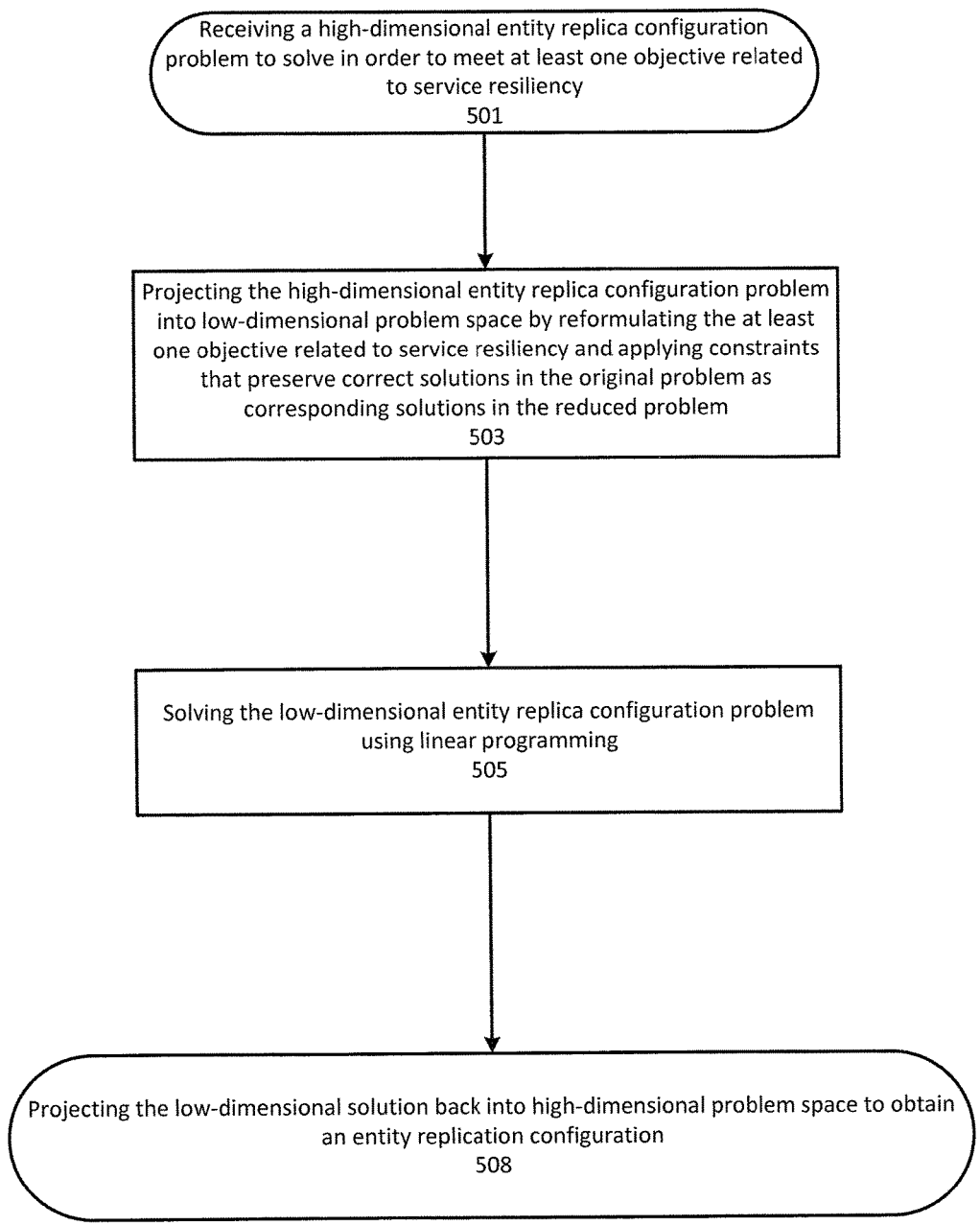
FIG. 5 is a flow diagram of an exemplary method for determining an entity replication configuration for a large-scale distributed system that provides service resiliency.

An exemplary method may receive an original high-dimensional replication configuration problem to achieve service resiliency formulated to meet at least one objective (501) and project the problem into low-dimensional space in order to solve a much simpler low-dimensional problem (503) as illustrated in FIG. 5. Low-dimensional problem space may be two-dimensions, requiring consideration of replica pairs. High-dimensional problem space may be any dimension higher than two. Projecting the high-dimensional entity replication configuration problem into low-dimensional problem space includes reformulating the objectives related to service resiliency and applying constraints that preserve correct solutions in the original problem as corresponding solutions in the reduced problem. The projection between the high-dimensional space and low-dimensional space is lossless, meaning that the correctness and the optimality of the solution for the constrained problem may be guaranteed when certain conditions are satisfied.

For example, there may be a large-scale system that has multiple entities and each entity may have five replicas. In order to determine a replica configuration for each entity for achieving service resiliency, a conventional method has to consider a five-dimensional vector as a full replica configuration of each entity: [$cluster_{k1}$, $cluster_{k2}$, $cluster_{k3}$, $cluster_{k4}$, $cluster_{k5}$], where each cluster in the set indicates the placement of the corresponding replica. The complexity of this problem, therefore, is the number of entities being stored in the system, n, raised to the fifth power or $n^5$.

By projecting this optimization problem into low-dimensional space, only replica pairs need to be considered, creating a two-dimensional vector as a full replica configuration: [$cluster_k^i$, $cluster_j^j$]. This two-dimensional vector indicates that the ith replica of the entity is placed in $cluster_k$ and the jth replica of the entity is placed in $cluster_j$. Using replica pairs greatly reduces the solution space, but does not lose any information since every optimal solution in an original problem space has a corresponding optimal solution in low-dimension space. The complexity of the problem becomes $n^2$*(select 2 from 5), where n equals 5.

The simpler problem in low-dimensional space may be solved by using linear programming, which realizes the linear objectives and constraints.

An example method may project the solution from the low-dimensional space back into the original high-dimensional space (508).

To determine a solution for a replication configuration problem that provides service resiliency, the problem may be divided into two sub-problems: offline replica placement and online scheduling. Offline replica placement determines an initial configuration for replicas in order to provide service resiliency. Online scheduling determine a new configuration that does not require data move or copy after a system failure or disruption, when load has been automatically shifted to failover clusters and the system is in an imbalanced state. This method may restore the system to a balanced state.

Offline Replica Placement

As discussed above, using RVD may allow a replication configuration problem to be formulated and solved in a low dimensional space by reducing the solution space to replica pairs instead of a complete replica configuration. However, to determine an initial replication configuration, certain conditions need to be imposed on a replication configuration problem in order for the conversion of the high-dimensional problem into low-dimensional space to be lossless, meaning that the dimensionality reduction preserves all correct and optimal solutions in the original problem as corresponding solutions in the reduced problem. Specifically, three conditions should be satisfied.

First, for all replicas, summing over all clusters, the number of entities with their ith replica placed in a particular cluster should equal the number of entities. This constraint means that for any given replica number (i), there should be exactly one replica of that number for each entity across all clusters in the large-scale distributed system. This condition guarantees consistency among the number of single replicas and the number of entities.

Figure 6:
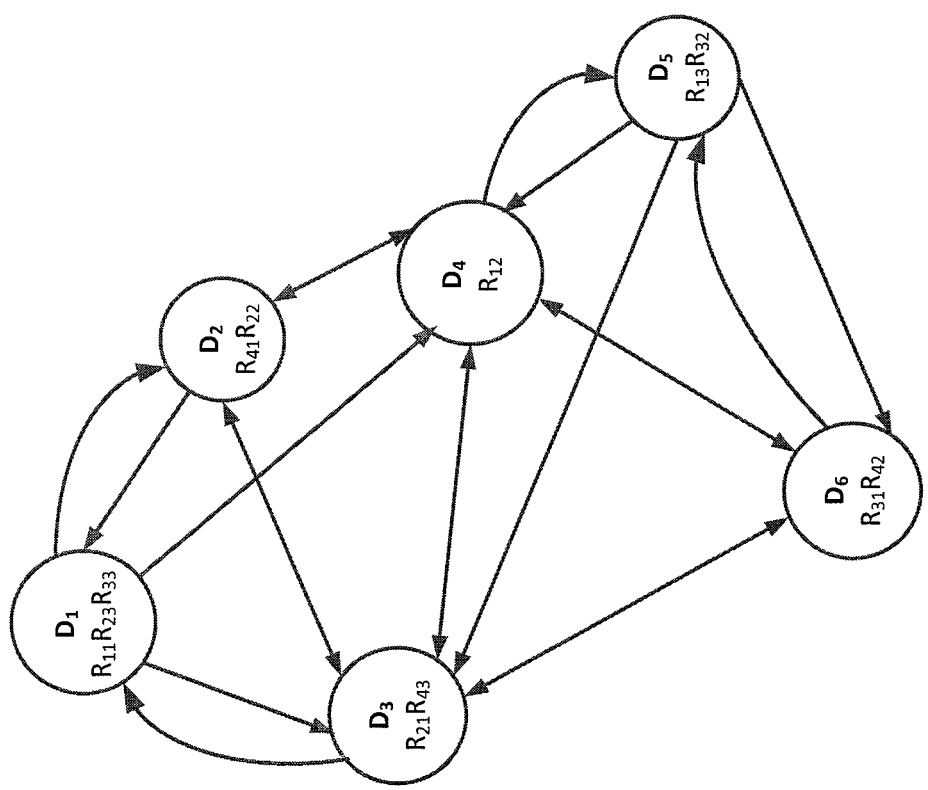
FIG. 6 is an example replication configuration.

For example, a system may have six clusters, $D_1$-$D_6$. The system may need to store four (4) entities, each having three (3) replicas. In FIG. 6, replicas are shown as $R_{st}$ where s is the entity number and t is the replica number. As shown, cluster $D_1$ contains three replicas, one for entity 1's first replica, one for entity 2's third replica, and one for entity 3's third replica.

To satisfy the first constraint, the configuration of FIG. 6 should have one replica for each replica number per each entity across all clusters. In other words, the replicas should be stored such that for each replica 1-3, there are exactly 4 replica 1s, 4 replica 2s, and 4 replica 3s, with exactly one replica of each number for each entity.

As illustrated, for replica 1, cluster $D_1$ contains one replica 1 for entity 1, cluster $D_2$ contains one replica 1 for entity 4, cluster $D_3$ contains one replica 1 for entity 2, cluster $D_4$ contains zero replica 1s, cluster $D_5$ contains zero replica 1s, and cluster $D_6$ contains one replica 1 for entity 3. Adding the total number of replica 1s over all clusters equals the total number of entities, 4. This constraint can also be verified for the other replica numbers in FIG. 6.

The formal constraint may be written as follows:

$$\forall_i \in \{1, \ldots, m\}, \sum_{D_k \in DC} x(D_k^i) = |E|$$

The second constraint may be that the summation of the number of replica pairs of a given entity with entity replica number i placed in cluster $D_k$ should equal the number of single replica count with entity replica number i in cluster $D_k$. This constraint guarantees the consistency between the number of single replicas and the number of replica pairs.

For example, suppose i equals 3, j equals two, and $D_k$ equals cluster $D_1$. The number of entity pairs where an entity has replica 3 in $D_1$ and replica 2 in any cluster should equal the number of entities that have replica 3 in $D_1$. In FIG. 6, the number of entities having replica 3 in cluster $D_1$ is two. Both entity $R_2$ and entity $R_3$ have their third replica in $D_1$. The number of entity pairs having replica 3 in $D_1$ and replica 2 in any cluster is also two. Entity $R_2$ has its replica 3 in $D_1$ and its replica 2 in $D_2$ so the cluster pair is [$D_1$, $D_2$]. Entity $R_3$ has its replica 3 in $D_1$ and its replica 2 in $D_5$ so the cluster pair is [$D_1$, $D_5$].

The formal constraint may be written as follows:

$$\forall_i \in \{1, \ldots, m\}, \forall_j \in \{1, \ldots, m\}, i \neq j \forall D_k \in DC,$$

$$\sum_{D_l \in DC} x(D_k^i, D_l^j) = x(D_k^i)$$

The third constraint may be that given a number of replica pairs, in each of which entity replica i being placed in cluster $D_k$ and entity replica j being placed in $D_l$, for any other replica r, the number of given replica pairs between i and j is less than or equal to the number of replica pairs between r and i and the number of replica pairs between r and j.

For example, let i=3, j=2, $D_k$=$D_1$, $D_l$=$D_2$. For this example, since there are only three replicas in FIG. 6 and replica numbers i, j, and r are distinct, replica number r must equal 1. The replica pairs between entities that have replica 3 in $D_1$ and replica 1 in any cluster are [$D_1$, $D_3$] (for entity $R_2$) and [$D_1$, $D_6$] (for entity $R_3$). The replica pairs between entities that have replica 2 in $D_2$ and replica 1 in any cluster include only [$D_2$, $D_3$]. There are two replica pairs that meet the first criteria and one replica pair that meets the second criteria. The minimum of these two sets of pairs is 1. This constraint states that the number of entities with replica number i (replica 3 in this example) being placed in cluster $D_k$ ($D_1$ in this example) and entity replica j (replica 2 in this example) being placed in cluster $D_l$ ($D_2$ in this example) is less than or equal to the minimum number of replica pairs between r and i, which as discussed above is 2 and the number of replica pairs between r and j, which is 1 in this example. Therefore, the number of entities with replica 3 in $D_1$ and replica 2 in $D_2$ must be 1 or less. In FIG. 6, the only entity with replica 3 in $D_1$ and replica 2 in $D_2$ is entity $R_2$. Therefore, this constraint is met. This constraint relies triangle equivalency properties.

The formal constraint may be written as follows:

$$\forall_i \in \{1, \ldots, m\}, \forall_j \in \{1, \ldots, m\}, \forall_r \in \{1, \ldots, m\}, i \neq j \neq r,$$
$$\forall D_k \in DC, \forall D_l \in DC,$$

$$x(D_k^i, D_l^j) \leq \sum_{D_l \in DC} \min(x(D_r^r, D_k^i), x(D_r^r, D_l^j))$$

To solve an optimization problem for service resiliency, replication configuration problem objectives should be chosen and reformulated into low-dimensional space. Then, a solution to the optimization problem should be found using linear programming.

Objectives & Low Dimensional Projection Formulas

Cascading Failure Avoidance

To prevent potential cascading failure caused by a single failure, there may be a constraint that between every ordered pair of clusters, the amount of load that potentially fails over from the first cluster to the second cluster must not exceed the spare serving capacity in the second cluster.

The reformulated objective may be the following:

$$\forall D_{k1} \in DC, \forall D_{k2} \in DC, D_{k1} \neq D_{k2},$$

$$x(D_{k1}^1, D_{k2}^2) + x(D_{k2}^1) \leq h_{k2}$$

where $h_{k2}$ is the total serving capacity of $D_{k2}$

Inter-Replica Service Load Shift Flow Optimization

To support online dynamic service scheduling (load balancing) without moving data, the service shift flow may be maximized among clusters. This shift flow configuration allows a system to shift load from any cluster to the rest of the system by simply reassigning the serving replicas of some entities. The objective may be defined as follows:

Let $F(D_{k1}, D_{k2}) = \alpha \min(h_{k1}, h_{k2}), 0 \leq \alpha \leq 1$ be the target service load shift capacity between cluster $D_{k1}$ and $D_{k2}$, where $h_{k1}$ and $h_{k2}$ are the serving capacities of clusters $D_{j1}$ and $D_{j2}$, respectively. Let Underflow be the penalty on each unit of service load below the target flow capacity between a pair of clusters. The formal constraint may be written as follows:

$$\sum_{D_{k1} \in DC} \sum_{D_{k2} \in DC, D_{k1} \neq D_{k2}} C_{underflow} \times f(D_{k1}, D_{k2})$$

Subject to
$\forall D_{k1} \in DC, \forall D_{k2} \in DC, D_{k1} \neq D_{k2}$, $$f(D_{k1}, D_{k2}) = \max\left(F(D_{k1}, D_{k2}) - \sum_{i1 \in \{1,\ldots,m\}} \sum_{i2 \in \{1,\ldots,m\}, i1 \neq i2} x(D_{k1}^1, D_{k2}^2), 0\right)$$

The reformulated objective may be as follows:

$$\sum_{D_{k1} \in DC} \sum_{D_{k2} \in DC, D_{k1} \neq D_{k2}} \text{Underflow} \times f(D_{k1}, D_{k2})$$

Subject to
$\forall D_{k1} \in DC, D_{k2} \in DC, D_{k1} \neq D_{k2}$ $$f(D_{k1}, D_{k2}) = \max\left(F(D_{k1}, D_{k2}) - \sum_{i1 \in \{1,\ldots,m\}} \sum_{i2 \in \{1,\ldots,m\}, i1 \neq i2} x(D_{k1}^1, D_{k2}^2), 0\right)$$

Inter-Replica Co-Fail Risk Minimization

An exemplary system may want to minimize the risk that more than one replicas of an entity are placed in clusters that are highly correlated in failure.

The formal constraint may be written as follows:

Let CoFail ([Dj1, . . . , Djm]) be the corresponding co-failing risk penalty associated with the entity replica configuration [Dj1, . . . , Djm]. The total co-failing risk minimization may be expressed as:
Minimize:

$\Sigma D_{j1} \in DC\ \Sigma D_{j2} \in DC\ \Sigma D_{jm} \in DC\ CoFail(Dj1, \ldots Djm) \times y(Dj1, \ldots, Djm)$ Inter-Replica Distance Optimization All replicas of an entity are preferred to be placed in clusters of one network region so that data communication between replicas of the entity do not need to rely on high-latency expensive WAN connections.

The formula can be written as follows:

Minimize: $\Sigma D_{k1} \in DC\ \Sigma D_{k2} \in DC\ \Sigma i1 \in \{1 \ldots m\} \Sigma i2 \in \{1 \ldots m\}, i1 \neq i2\ x(D_{k1}^{i1}, D_{k2}^{i2}) \times \text{dist}(D_{k1}, D_{k2})$, where $\text{dist}(D_{k1}, D_{k2})$ is the cost of network distance between clusters Dk1 and Dk2, which hold 2 different entity replicas.

High-Usage Capacity Planning

This optimization achieves high usage of resources while offering high resiliency. An exemplary method creates a set of cluster serving capacity variables (less than or equal to the real available resources in corresponding clusters) that are used as the upper limit of resources that can be used by an application. These capacity decision variables and related constraints are formulated into the offline replica placement problem.

Minimize:

$$\sum_{D_k \in DC} C_{cluster}(D_k) \times h_k$$

Subject to:
$\forall D_k \in DC$, $$h_k \leq H_k, \sum_{j \in \{2,\ldots m\}} \sum_{l \in DC} x(D_k^1, D_l^j) \leq h_k$$

where $C_{cluster}(D_k)$ denotes the cost of unit resource in cluster $D_k$ and $H_k$ is the hard limit of resources in cluster $D_k$.

The solution to any offline placement problem should be projected to high-dimensional space. The solution pairs of the offline placement problem, $x(D_{k1}^{i1}, D_{k2}^{i2})$, form a set of x-matrices. There are $C(m, 2)$ (selecting 2 from m) x-matrices, where m is the number of entity replicas for each data entity and n is the number of clusters in the system. Each of these x-matrices is a n-by-n matrix, representing the placement distribution (over clusters) of a pair of entity replicas. Each element in a x-matrix represents the number of entities with the specific pair of replicas being placed in different clusters pairs. For example, suppose in an application, each entity has 3 replicas, and there are 3 clusters in the system. The element at row i and column j in the x-matrix for 1st and 2nd replica indicates the number of entities that have their 1st replica in cluster i and 2nd replica in cluster j. Similarly, the matrices for other replica pairs, such as, 2nd and 3rd replicas, 1st and 3rd replicas, are defined.

The offline low-to-high projection proceeds as an iterative procedure to construct a replica configuration (and the corresponding number of entities in the replica configuration) from the x-matrices. Each iteration constructs a replica configuration and its corresponding number of entities by working as a depth-first-search, which goes through all entity replicas, from 1 to m, to find a positive number of entities that have all their replicas placed in certain clusters, with one condition, that is, the x-matrices with these entities subtracted must still satisfy the third constraint articulated above. After finding/constructing this replica configuration and its corresponding number of entities, the entities may be subtracted from the corresponding x-matrices. The iteration repeats till the x-matrices are all subtracted to zero, and at the same time the whole replication configuration is obtained. The solution of the offline placement problem results in a replication configuration in which the serving-failover graph is well-connected.

Online Scheduling

The goal of online scheduling is to determine a new replication configuration that does not require data moves or copies, but restores a large-scale distributed system to a balanced state after a failure or disruption. In some embodiments, online scheduling may take advantage of a good initial placement established by an exemplary offline placement method. With online scheduling, a system may be able to transition to the new configuration in a very short time, which means that the transition cannot involve large-scale data moves or copying. In an exemplary method, data moves may be restricted and only replica roles may be changed (i.e. a replica may be changed from a primary replica, replica 1, to a secondary replica, replica 2) in an entity replica configuration. Therefore, the entity replica set does not change from an initial configuration. For example, the replica set for entity $R_1$ in FIG. 6 is $[D_1, D_4, D_5]$. Entity $R_1$'s primary (serving) replica is in $D_1$ and its secondary (failover) replica is in $D_4$. Using online scheduling, a possible new configuration may be $[D_4, D_5, D_1]$. Although the replica set does not change for entity $R_1$, the primary (serving) replica is now set to $D_4$ and its secondary (failover) replica is set to $D_5$.

The constraint required for online scheduling is that for any cluster pair in the current configuration, the same pair occurs, the same number of times, in the new configuration.

The formal constraint may be expressed as follows:

$$\forall D_{k1} \in DC, \forall D_{k2} \in DC,$$
$$\sum_{i1 \in \{1,\ldots m\}} \sum_{i2 \in \{1,\ldots m\}, i1 \neq i2} x(D_{k1}^{i1}, D_{k2}^{i2}) = \sum_{i1 \in \{1,\ldots m\}} \sum_{i2 \in \{1,\ldots m\}, i1 \neq i2} x(D_{k1}^{i1}, D_{k2}^{i2})$$

In this constraint, all $x(D_{k1}^{i1}, D_{k2}^{i2})$ variables form the replica pair distribution corresponding to the given replication configuration.

As discussed above regarding offline placement, to solve an optimization problem for service resiliency, replication configuration problem objectives should be chosen and reformulated into low-dimensional space. Objectives may use similar formulas to those indicated above.

Then, a solution to the optimization problem should be found using linear programming.

The solution should then be projected to high-dimensional space. A replication configuration may be constructed from a valid set of replica pair distribution variables, which is the solution of the low-dimensional online scheduling problem. The solution values of all replica pair distribution variables $x(D_{k1}^{i1}, D_{k2}^{i2})$ form a x-matrix. The replication configuration construction procedure works as an iterative matrix subtraction procedure.

Each iteration works as a depth-first-search, which goes through the clusters one after another in a given entity replica set from the offline replica placement solution or an initial configuration set. In an iteration, for the current cluster under examination, the exemplary method finds the entity replica that allows positive replica pair counts between the current replica pairs in this iteration. At the end of the current iteration, every cluster in the given entity replica set is assigned with an entity replica, and the number of entities in the resulted replica configuration is subtracted from all corresponding variables in the x-matrix and from the current entity replica set. The iterative matrix subtraction continues until all given entity replica sets are zero and the whole replication configuration is obtained. The difference between the projection of the solution for online scheduling problem and the offline placement problem is the depth first search starting with a given replica set.

The online low-to-high projection proceeds as an iterative procedure to construct a replica configuration (and the corresponding number of entities in the replica configuration) from the x-matrices. Each iteration constructs a replica configuration and its corresponding number of entities by working as a depth-first-search, which goes through all entity replicas from 1 to m, and finds a positive number of entities that have all their replicas placed in certain clusters, with two conditions. The first condition is, the x-matrices with these entities subtracted must still satisfy equation 3 above. The second condition is, the replica config under construction must match one of the given replica sets. After finding/constructing this replica configuration and its corresponding number of entities, entities may be subtracted from the x-matrices correspondingly. The iteration repeats until the x-matrices are all subtracted to zero, and at the same time the whole replication configuration is obtained.

For both offline placement and online scheduling methods of RVD, entities may have different replication setup, requirements, or properties. (e.g., different data entities' replicas may be required or preferred to be placed in certain regions (sets of computer clusters), for legal, performance, or other reasons. Entities may also have different numbers of replicas. Some entities may have a high rate of service requests to them, while some other entities may be subject to low rate of service requests, which makes a difference in entity service load profiling. Entities may be categorized into groups based on these differences, with each group containing homogeneous entities. Applying RVD lossless dimensionality reduction on each entity group solves the fine-grained replication configuration problem with heterogeneous entities.

Cascading Failure Prevention

To prevent cascading failures in a large-scale distributed system, conventional methods guarantee that the failover load of a cluster is within the serving capacity of the failover cluster for every serving/failover cluster pair. However, this scheme only prevents cascading failure for one single cluster failure in the system. If there is a second failure, there may be cascading failures since there are no balancing capabilities in traditional methods.

In an exemplary embodiment, a replication configuration problem may be formulated with an objective to prevent cascading failures no matter how many failures occur in the large-scale distributed system. This problem may be formulated to have two sub-objectives. First, a replication configuration may be optimized to serve as many entities as possible in a balanced and reliable way, given the serving capacity in the current state of the system. Second, the replication configuration may only allow the load of a certain portion of the served entities to fail over to their secondary replicas if the current system capacity cannot handle all failover load in order to prevent cascading failures.

In order to meet these sub-objectives, the current system conditions may be determined and evaluated. An example method may determine whether clusters are failed or stable and the capacity of each cluster in the system. The variance of entity loads may also be considered. Entity load can vary with time, location, and can vary from entity to entity. Network communication may also vary and cause changes in entity load. For example, entity loads may change at different times and different locations providing varying loads on the network. This variance may affect network bandwidth and network delay. The computing resources available in the system may also affect entity load. A certain computing demand may present different loads on different computing platforms since certain computing devices may process loads faster than others. A high-dimensional cascading failure avoidance problem may be formulated in high-dimensional problem space to with an objective related to preventing cascading failures. The high-dimensional cascading failure avoidance problem may then be projected into low-dimensional problem space to create a low-dimensional cascading failure avoidance problem by applying constraints that preserve correct solutions in the original problem as corresponding solutions in the reduced problem.

An objective related to preventing cascading failures may be formulated to minimize the number of entities that are not allowed to shift service load to other replicas or clusters by the system's automatic failover mechanism, while guaranteeing that there will not be any future cascading failures. The formal objective may be formulated as follows:

Minimize:

$$\sum_{D_{k1} \in DC} \cdots \sum_{D_{km} \in DC} Nobackup \times x'(D_{k1}^1, \ldots D_{km}^m)$$

Subject to:
$\forall D_{k1} \in DC, \forall D_{k2} \in DC, D_{k1} \neq D_{k2},$ $$\sum_{D_{l3} \in DC} \cdots \sum_{D_{lm} \in DC} (x(D_{k1}^1, D_{k2}^2, D_{l3}^3, \ldots D_{lm}^m) - x'(D_{k1}^1, D_{k2}^2, D_{l3}^3, \ldots D_{lm}^m)) +$$

$$\sum_{D_{l2} \in DC} \cdots \sum_{D_{lm} \in DC} x(D_{k2}^1, D_{l2}^2, \ldots D_{lm}^m) \leq h_{k2}$$

where $h_{k2}$ is the total serving capacity of $D_{k2}$, Nobackup is the penalty for one entity not being assigned with a failover replica, i.e., the service load of the entity cannot be failed over to any other replica, and $x'(D_{k1}^1, \ldots, D_{lm}^m)$ is the intermediate variable capturing the number of entities that do not have a failover replica assigned.

An exemplary method may additionally calculate the capacity of each cluster and determine a failover amount that prevents further cascading failures if there are additional failures in the system. This method prevent cascading failure by allowing load shifting to increase the service load of a cluster, but may not shift the entire load of a failed cluster to other clusters. The partial load shift may automatically failover only the load amount that can be sustained by the system as determined by the online scheduling method. This partial load shift may reduce the number of entities that can be served in the system at a given time, but may ensure that the system does not fail entirely.

An example cascading failure avoidance problem may be solved using a dimensionality reduction technique such as the offline placement or online scheduling methods discussed above. Although in the above-mentioned techniques the total amount of load is failed over from a failing cluster, the amount of load that is failed over into a healthy cluster may be determined by an exemplary method. This method may distribute the failover load to healthy clusters is a way so that no other healthy clusters will be overloaded and thus fail. The exemplary method may use the failover constraint described above to guarantee no cascading failures.

A replication configuration may be obtained that shifts and load balances the system after a dimensionality reduction technique is used to solve the cascading failure avoidance problem.

After a failure or a disruption, an exemplary method may shift the load from the failed or disrupted cluster(s) to other clusters in the large-scale distributed system. This shift may happen automatically. Then, the exemplary method may balance the system.

Figure 7:
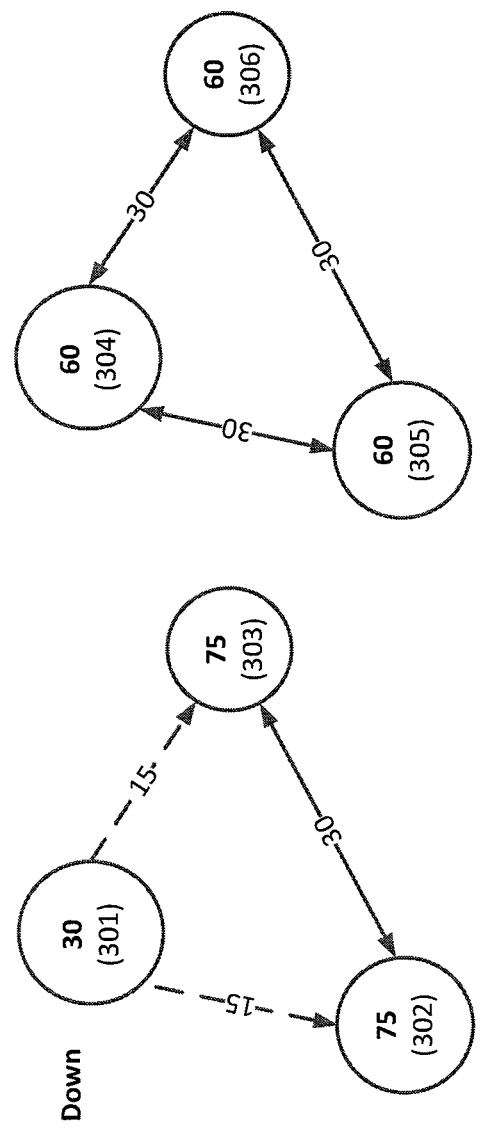
FIG. 7 is an example of cascading failure prevention.

For example, given the initial load distribution of FIG. 3a, a cascading failure avoidance method may not fail over all the load from a failed cluster as shown in FIG. 7 (301). Instead, the amount of load that is failed over into a healthy cluster (302, 303) is determined by the method so that no other clusters will fail. As shown in FIG. 7, only half of the failed cluster's (301) load is failed over to other clusters (302, 303) so that the other clusters do not become heavy-loaded and prone to failure. As discussed above, the goal of an example cascading failure avoidance method is to serve as many entities as possible while preventing cascading failure.

Figure 9:
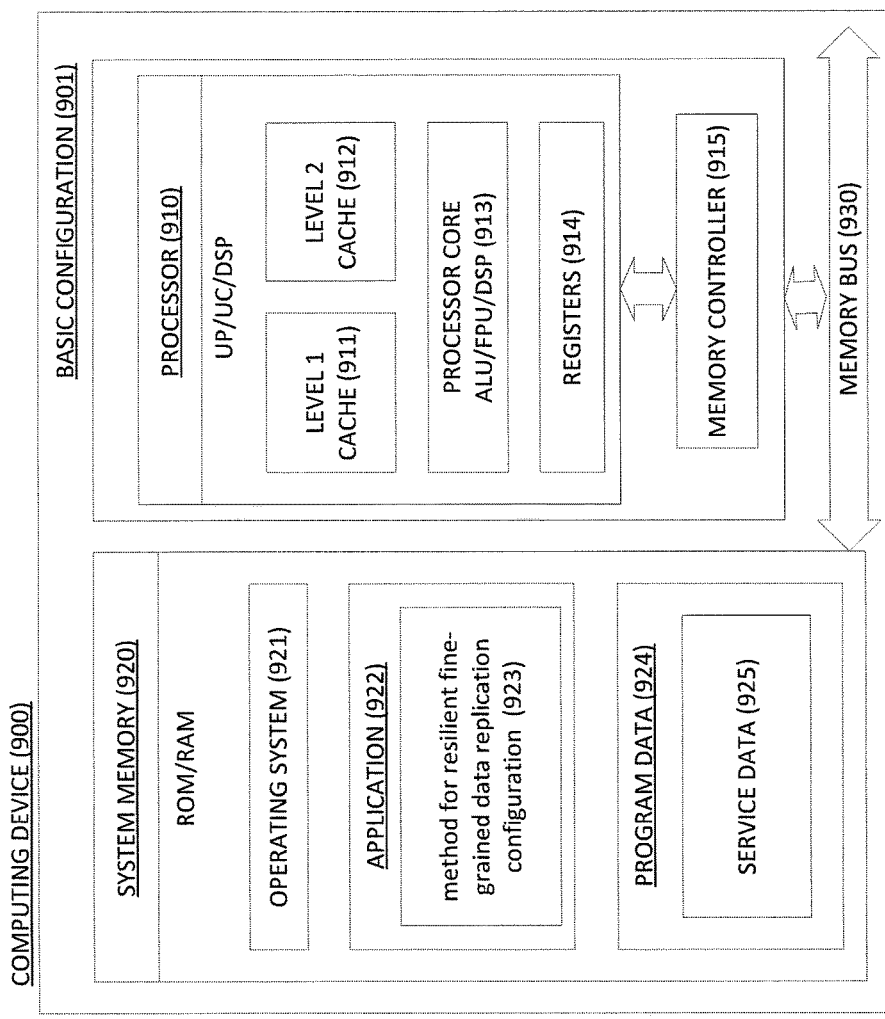
FIG. 9 is a block diagram illustrating an exemplary computing device.

FIG. 9 is a high-level block diagram of an exemplary computer (900) that is arranged for resilient fine-grained data replication configuration. In a very basic configuration (901), the computing device (900) typically includes one or more processors (910) and system memory (920). A memory bus (930) can be used for communicating between the processor (910) and the system memory (920).

Depending on the desired configuration, the processor (910) can be of any type including but not limited to a microprocessor (µP), a microcontroller (µC), a digital signal processor (DSP), or any combination thereof. The processor (910) can include one more levels of caching, such as a level one cache (911) and a level two cache (912), a processor core (913), and registers (914). The processor core (913) can include an arithmetic logic unit (ALU), a floating point unit (FPU), a digital signal processing core (DSP Core), or any combination thereof. A memory controller (916) can also be used with the processor (910), or in some implementations the memory controller (915) can be an internal part of the processor (910).

Depending on the desired configuration, the system memory (920) can be of any type including but not limited to volatile memory (such as RAM), non-volatile memory (such as ROM, flash memory, etc.) or any combination thereof. System memory (920) typically includes an operating system (921), one or more applications (922), and program data (924). The application (922) may include a system for resilient fine-grained data replica configuration. Program Data (924) includes storing instructions that, when executed by the one or more processing devices, implement a system and method for creating resilient fine-grained data replica configurations. (923). In some embodiments, the application (922) can be arranged to operate with program data (924) on an operating system (921).

The computing device (900) can have additional features or functionality, and additional interfaces to facilitate communications between the basic configuration (901) and any required devices and interfaces.

System memory (920) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 1200. Any such computer storage media can be part of the device (900).

The computing device (900) can be implemented as a portion of a small-form factor portable (or mobile) electronic device such as a cell phone, a smart phone, a personal data assistant (PDA), a personal media player device, a tablet computer (tablet), a wireless web-watch device, a personal headset device, an application-specific device, or a hybrid device that include any of the above functions. The computing device (900) can also be implemented as a personal computer including both laptop computer and non-laptop computer configurations.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium. (e.g., a fiber optic cable, a waveguide, a wired communications link, a wireless communication link, etc.)

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method for preventing cascading failures of clusters in a large-scale distributed system storing data entities, the method comprising:
    storing a plurality of replicas for each entity of a plurality of entities, wherein
        each replica of each entity is associated with a replica number such that for any given replica number i, there is one replica with replica number i for each entity stored in the system, and
        the number of entities having replica number i stored in a first cluster and replica number j stored in a second cluster is less than or equal to the minimum of (a) the number of entities having replica number i stored in the first cluster and replica number r stored in any other cluster and (b) the number of entities having replica number j stored in the second cluster and replica number r in any other cluster, where replica numbers i, j, and r are distinct;
    serving requests for the stored entities' data;
    determining whether, in the event of a cluster failure, an entire load from a cluster can be failed over by the system without resulting in one or more additional cluster failures; and
    responsive to determining that the entire load from a cluster cannot be failed over by the system without resulting in one or more additional cluster failures, identifying a partial amount of cluster load to failover in the event of a cluster failure.

2. The computer-implemented method of claim 1 further comprising determining and serving the maximum number of entities that can be served by the system.

3. The computer-implemented method of claim 1 further comprising determining and serving the maximum number of entities that can be served by the system and wherein determining the maximum number of entities that can be served by the system includes identifying the variance of entity loads in the system.

4. The computer-implemented method of claim 3, wherein the variance of entity loads may be affected by time, entity type, or entity location.

5. The computer-implemented method of claim 3, wherein the variance of entity loads may be affected by network communication variance including network bandwidth and network delay.

6. The computer-implemented method of claim 3, wherein the variance of entity loads may be affected by computing resources available in the large-scale distributed system.

7. The computer-implemented method of claim 2 further comprising using a dimensionality reduction technique in order to determine the maximum number of entities that can be served by the system and the amount of load that should be failed over, and wherein the dimensionality reduction technique is online scheduling.

8. The computer-implemented method of claim 2 further comprising using a dimensionality reduction technique in order to determine the maximum number of entities that can be served by the system and the amount of load that should be failed over, and wherein the dimensionality reduction technique is offline placement.

9. A system for preventing cascading failures of clusters in a large-scale distributed system storing data entities, the system comprising:
    one or more processing devices and
    one or more storage devices storing instructions that, when executed by the one or more processing devices, cause the one or more processing devices to:
    store a plurality of replicas for each entity of a plurality of entities, wherein
        each replica of each entity is associated with a replica number such that for any given replica number i, there is one replica with replica number i for each entity stored in the system, and
        the number of entities having replica number i stored in a first cluster and replica number j stored in a second cluster is less than or equal to the minimum of (a) the number of entities having replica number i stored in the first cluster and replica number r stored in any other cluster and (b) the number of entities having replica number j stored in the second cluster and replica number r in any other cluster, where replica numbers i, j, and r are distinct;

serve requests for the stored entities' data;

determine whether, in the event of a cluster failure, an entire load from a cluster can be failed over by the system without resulting in one or more additional cluster failures; and responsive to determining that the entire load from a cluster cannot be failed over by the system without resulting in one or more additional cluster failures, identify a partial amount of cluster load to fail over in the event of a cluster failure.

10. The system of claim 9, wherein the instructions further comprise determining and serving the maximum number of entities that can be served by the system.

11. The system of claim 9, wherein the instructions further comprise determining and serving the maximum number of entities that can be served by the system and determining the maximum number of entities that can be served by the system includes identifying the variance of entity loads in the system.

12. The system of claim 11, wherein the variance of entity loads may be affected by time, entity type, or entity location.

13. The system of claim 11, wherein the variance of entity loads may be affected by network communication variance including network bandwidth and network delay.

14. The system of claim 11, wherein the variance of entity loads may be affected by computing resources available in the large-scale distributed system.

15. The system of claim 10, wherein the instructions further comprise using a dimensionality reduction technique in order to determine the maximum number of entities that can be served by the system and the amount of load that should be failed over, and wherein the dimensionality reduction technique is online scheduling.

16. The system of claim 10, wherein the instructions further comprise using a dimensionality reduction technique in order to determine the maximum number of entities that can be served by the system and the amount of load that should be failed over, and wherein the a dimensionality reduction technique is offline placement.

* * * * *